United States Patent [19]

Yamada et al.

[11] 4,030,027
[45] June 14, 1977

[54] APPARATUS FOR NON-CONTACT MEASUREMENT OF DISTANCE FROM A METALLIC BODY USING A DETECTION COIL IN THE FEEDBACK CIRCUIT OF AN AMPLIFIER

[75] Inventors: Takeo Yamada; Seigo Ando, both of Yokohama; Katsujiro Watanabe, Tokyo, all of Japan

[73] Assignee: Nippon Kokan Kabushiki Kaisha, Tokyo, Japan

[22] Filed: Oct. 30, 1975

[21] Appl. No.: 627,463

[30] Foreign Application Priority Data

Nov. 6, 1974 Japan .......................... 49-127048
Mar. 25, 1975 Japan ............................ 50-34929

[52] U.S. Cl. ............................................ 324/34 D
[51] Int. Cl.² ..................................... G01R 33/12
[58] Field of Search ............ 324/34 R, 34 D, 34 PS, 324/34 TK, 40, 41, 61 R; 331/65 R; 328/5; 340/258 C

[56] References Cited
UNITED STATES PATENTS

| | | |
|---|---|---|
| 3,609,527 | 9/1971 | Ellis ..................................... 324/40 |
| 3,609,580 | 9/1971 | Thompson et al. ................... 331/65 |
| 3,883,796 | 5/1975 | Holt et al. ....................... 324/34 PS |

Primary Examiner—Robert J. Corcoran

[57] ABSTRACT

Apparatus for non-contact measurement of the distance between a detecting coil and a metallic body mounted in confronting relation thereto comprising a differential amplifier to one terminal of which is connected a reference oscillator and to the other terminal of which is connected a feedback circuit. The feedback circuit incorporates the detecting coil and the amplified differential output signal between the AC signals applied to the differential amplifier and the signal supplied to the differential amplifier resulting from the impedance of the detecting coil corresponding to the distance between the detecting coil and the metallic body are thus a measure of the distance. At least one of the parameters of open-loop gain of the differential amplifier and the amount of feedback in the feedback circuit is pre-determined so as to linearize at least for a pre-determined measuring range the output characteristics of the differential amplifier resulting from the variation of the detecting coil impedance caused by the variation of the distance.

6 Claims, 11 Drawing Figures

APPARATUS FOR NON-CONTACT MEASUREMENT OF DISTANCE FROM A METALLIC BODY USING A DETECTION COIL IN THE FEEDBACK CIRCUIT OF AN AMPLIFIER

BACKGROUND OF THE INVENTION

This invention relates to apparatus for measuring the distance between a metallic body, for example a steel material and a sensor of a measuring apparatus and more particularly to a method for measuring the distance between a detecting coil and a metallic body at high accuracies without contacting the metallic body.

For the measurement of a metallic body, for example measurement of the bend, position and so on of a steel plate during its rolling process, at high accuracies without contacting the metallic body, a method utilizing electromagnetic induction as diagramatically shown in FIG. 1 has been used. In the figure, an object (metallic body) to be measured is indicated by the numeral 1. A reference oscillator 2 generating AC signals of a predetermined frequency is connected to the input terminals of an AC brige circuit 3 consisting of impedances $Z_1$, $Z_3$ and $Z_4$ having known impedances and an impedance $Z_2$, the impedance $Z_2$ being variable and, in the figure, represented by the impedance of a detecting coil 4. A differential amplifier 5 is connected to the output terminals of the bridge circuit 3. With the distance between the detecting coil 4 and the metallic body 1 being substantially infinite, and the AC signals from the reference oscillator 2 being applied to the bridge circuit 3 including the detecting coil 4, the bridge circuit becomes balanced when the condition $Z_1 \cdot Z_4 = Z_2 \cdot Z_3$ is satisfied. Under such balanced condition, the output from the bridge circuit 3 is zero and hence the differential amplifier 5 produces no output. As the distance D between the detecting coil 4 and the metallic body 1 decreases from the aforesaid infinite stage, the impedance $Z_2$ of the detecting coil 4 varies with the distance D due to the variation of the self-induction caused by the electromagnetic induction in the metallic body. As is well known in the art the impedance $Z_2$ varies non-linearly with respect to the distance D. As a result, the variation of the output of the brige circuit 3 is also non-linear. The output of the brige circuit 3 is amplified by the differential amplifier 5 to a prescribed value and then supplied to an indicating meter or a recording meter, and thus the measurement of the distance D can be carried out without contacting the metallic body. FIG. 2 shows an example of a relational characteristic between the distance D and the output voltage $V_{pp}$ of the differntial amplifier.

As seen from FIG. 2, the output characteristic with respect to distance in such prior art measuring apparatus is non-linear. Especially, as the distance D decreases, and accordingly high accuracies cannot be attained. Consequently, it is necessary for practical use to linearize the characteristic by some means such as by providing a suitable external circuit. Moreover, as the rate of change of the impedance $Z_2$ of the detecting coil with respect to the variation of the distance D between the detecting coil and the metallic body is very small, the bridge circuit 3 is needed for obtaining sufficiently high sensitivity. The accuracy of measurement is greatly influenced by the accuracy and characteristics of the fixed impedances $Z_1$, $Z_3$ and $Z_4$ constituting the bridge circuit, and high skill is required for adjusting the bridge circuit.

For overcoming such disadvantageous problems in the prior art, the inventors presented a method and apparatus as shown by FIG. 3 (Ser. No. 521,812, now U.S. Pat. No. 3,997,835). In the figure, similar numerals indicates like parts as in FIG. 1 having like effects. A feedback amplifier 6 is connected to a reference oscillator 2 through a series resistor $R_s$. A feedback resistor $R_p$ is connected in parallel to the amplifier 6. A capacitor C is connected in parallel to the detecting coil 4 to form a parallel resonance circuit together with the impedance of the detecting coil 4. AC signals of a fixed amplitude and frequency from the reference oscillator 2 are applied to the parallel resonance circuit through the series resistor $R_s$, and the voltage across the parallel resonance circuit is applied to the input terminal of the feedback amplifier 6. The feedback amplifier 6 amplifies the input voltage to an output voltage of a desired value which is then positive-feedbacked to the input side of the amplifier 6 through the feedback resistor $R_p$, thus constituting a Q-multiplier.

Now, the distance between the detecting coil 4 and a metallic body 1 is set to be substantially infinite, and the capacitance of the capacitor C is so adjusted that the resonance frequency of the parallel resonance circuit becomes equal to the resonance frequency of the oscillator 2.

Under such conditions, when the distance between the detecting coil 4 and the metallic body 1 decreases, the alternating magnetic field generated by the detecting coil 4 interlinks with the metallic body 1 to change the impedance of the detecting coil 4. As a result, an input voltage corresponding to the distance between the metallic body 1 and the detecting coil 4 is applied to the feedback amplifier 6 and then is amplified to be an output voltage at the output terminal of the amplifier 6. Thus, by measuring this output voltage, the distance between the metallic body 1 and the detecting coil 4 can be determined with high accuracy.

The aforesaid problems can be overcome by the apparatus of FIG. 3, but other disadvantageous problems such as the following appear with this apparatus:

1. as the measurement accuracy is influenced by the variation in the oscillation frequency of the reference oscillator 2, a high stability oscillator such as an X-tal oscillator is needed for practical use;
2. the impedance of the detecting coil 4 changes in accordance with the temperature change to make the resonance frequency of the parallel resonance circuit vary causing a decreased measurement accuracy;
3. the oscillation frequency of the reference oscillator and the oscillation frequency of the parallel resonance circuit must be equalized to each other, but the adjustment for the equalization is not easy; and
4. as the resonance circuit is employed, the frequency characteristic is not good due to the band characteristic.

SUMMARY OF THE INVENTION

Accordingly, an object of the invention is to provide an improved non-contact type apparatus for measuring the distance to an object to be measured with high sensitivity wherein the output characteristics of measurement with respect to the distance to be measured is linear and the above-described disadvantages can be eliminated.

Another object of the invention is to provide an improved non-contact type apparatus for measuring the distance to an object to be measured wherein the non-linear distance-impedance variation characteristic is complemented to produce a final output having a linear characteristic by adjusting the output characteristic of a feedback amplifier controlled by the variation in the amount of feedback due to the non-linear distance-impedance variation characteristic by means of defining a gain and/or feedback amount in the feedback amplifier.

A further object of the invention is to provide an improved non-contact type apparatus for measuring the distance to an object to be measured wherein the measurement error due to the variation in frequency is eliminated.

A still further object of the invention is to provide an improved non-contact type apparatus for measuring the distance to an object to be measured wherein the measurement error due to the variation in impedance of a detecting coil caused by temperature variation is greatly reduced.

A still further object of the invention is to provide an improved non-contact type apparatus for measuring of the distance to an object to be measured wherein the amount of feedback can be easily adjusted to linearize the relational characteristic between the output voltage and the distance to the metallic body.

In the method of measuring distance according to the invention, the feedback of an amplifier is composed of a feedback impedance and the impedance of a detecting coil, the amplification of the amplifier is controlled in accordance with the value of impedance of the detecting coil, and the distance between the detecting coil and a metallic body to be measured can be determined by measuring the output of the amplifier. The amplification characteristic of the feedback amplifier is so adjusted as to present a complemental non-linear characteristic for the non-linearity of the distance-impedance variation characteristic of the detecting coil by varying the gain of the amplifier and/or varying the amount of positive feedback according to the value of feedback impedance whereby to obtain a complemented linearity in the characteristic. The invention enables the continuous measurement of the distance to metallic body in non-contact manner and has various uses such as detection of position, detection of bend, detection of shape, etc.

In the apparatus the invention, as the measurement is performed by detecting the variation in the impedance of the detecting coil due to the variation in the distance between the detecting coil and the metallic body to be measured, the measured value is influenced by the composition of the metallic body to be measured which influences the rate of variation in the impedance of the detecting coil. However, such measurement is, in general, applied for a substantially definite composition over a long period continuously, such as in the matching of steel material and the rolling of steel plate, and so, by making calibration once for a metallic material to be measured, accurate measurement of the distance to the metallic body, that is, a metallic body or bodies, can be made. When applying for metallic bodies of varied compositions, only re-calibration for respective metallic bodies is necessary. As to the measurement for various kinds of steel material of various compositions, for example, since the variation in magnetic characteristic due to the kinds of steels is small, the errors in the measured values can be negligible in the case where the measurement with one calibration is adopted to one and the same line of machining different kinds of steels in a workshop in general.

The invention will now be more fully described in conjunction with the accompanying drawings.

DETAILED DESCRIPTION

Figure 4:
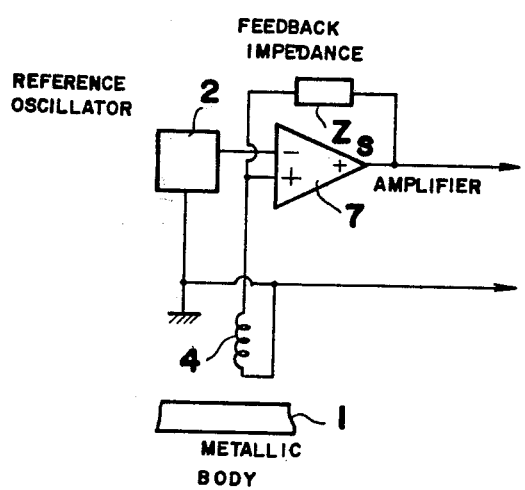
FIG. 4 is a block diagram showing the basic construction of measuring apparatus used in the present invention.
Figure 5:
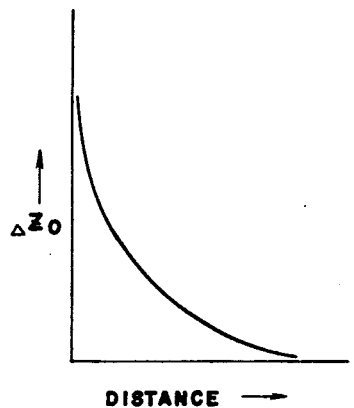
FIG. 5 is a graph showing the impedance variation characteristic of the detecting coil in the apparatus of FIG. 4.

Referring now to FIG. 4, a detecting coil 4 is disposed to confront a metallic body 1 whose distance therefrom is to be measured, a reference oscillator 2 is connected to an input terminal of an amplifier 7, the other input terminal of an amplifier 7 is connected to the end of the detecting coil 4, and a feedback impedance $Z_s$ being connected between an output terminal and said other input terminal of the amplifier 7. AC signals of a definite amplitude and a definite frequency from the reference oscillator 2 are applied to the amplifier 7 and are amplified by the amplifier to an output voltage of a desired value, a part of the output voltage being supplied to the detecting coil 4 through the feedback impedance $Z_s$ as AC feedback signals. The impedance $Z_0$ of the detecting coil 4 varies in accordance with the distance between the detecting coil 4 and the metallic body 1. The variation characteristic of the impedance $Z_0$ is determined by the electromagnetic loop containing the metallic body 1 and is non-linear with respect to the variation in the distance between the detecting coil and the metallic body (an example being shown in FIG. 5). The amplification $\dot{A}$ of the feedback amplifier is given by the following formula:

$$\dot{A} = G/(1 - G\dot{\beta})$$

where $\dot{\beta} = \dot{Z}_0/(\dot{Z}_s + \dot{Z}_0)$, and

G: gain at the time of non-feedback.

Thus, the amplification of the feedback amplifier is determined only by $\dot{Z}_0$ when G and $\dot{Z}_s$ are given. The amplification $\dot{A}$ is of a non-linear characteristic with respect to the variation of $\dot{Z}_0$ as can be understood from the above formula, and can present any desired non-linear characteristic curves by adjusting G and $\dot{Z}_s$ ($\beta$). Since the variation in the impedance $\dot{Z}_0$ of the detecting coil 4 is non-linear with respect to the variation in the distance between the detecting coil and the metallic body as described above and the amplification A of the amplifier 7 can have a complemental characteristic for the variation of $Z_0$, by the complement between the characteristics of the impedance $Z_0$ and the amplification A, an approximately linear characteristic of the amplification with respect to the variation of the distance between the detecting coil and the metallic body to be measured can be obtained. Accordingly, the distance between the detecting coil 4 and the metallic body 1 can be measured at high accuracies with good linear relation.

Figure 6:
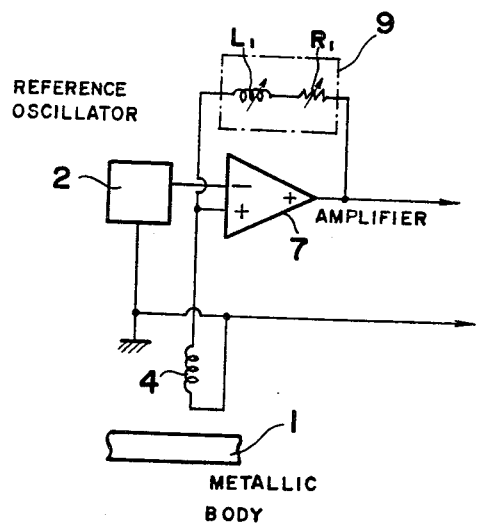
FIG. 6 shows the detailed construction of the feedback circuit in the apparatus of FIG. 4.

An example of the construction of the feedback circuit for adjusting the relation between the output voltage of the amplifier 7 and the distance to the metallic body 1 to be measured to a linear form is shown in FIG. 6. In the figure, a series circuit of a variable inductance $L_1$ and a variable resistor $R_1$ is connected across the amplifier 7. The range of the inductance variation of the variable inductance $L_1$ is in general up to 10:1, and by applying the complemental effect obtained by adjusting the value of inductance within such range to the amplifier the input/output characteristic of the measuring system can be made linear.

Figure 7:
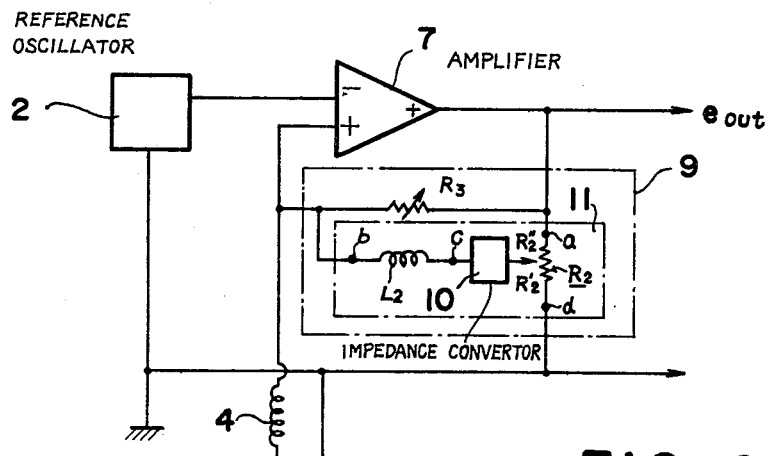
FIG. 7 shows another embodiment of the feedback circuit.

Fine adjustment is, however, difficult with the above-described variable inductance. When an adjustment of higher precision or a wider variation in inductance is required, this requirement can be attained by constructing the feedback circuit connected across the amplifier 7 as a series circuit of a variable resistance for dividing output voltage, an impedance converter and a fixed inductance together with a variable resistance connected in parallel to this series circuit as shown in FIG. 7. FIG. 7 is a block diagram of an apparatus for measuring distance suitable to meet the above-described requirement which comprises a reference oscillator 2, and amplifier 7, a detecting coil 4, and a feedback circuit 9 for adjusting linearity of the relation between the output of the amplifier 7 and the distance between the detecting coil 4 and a metallic body 1 to be measured. The feedback circuit 9 is constructed of a series circuit 11 of a variable resistor $R_2$ for dividing the output voltage of the amplifier 7, an impedance converter 10 and a fixed inductance $L_2$, together with a variable resistor $R_3$ connected in parallel with the series circuit 11.

Figure 8:
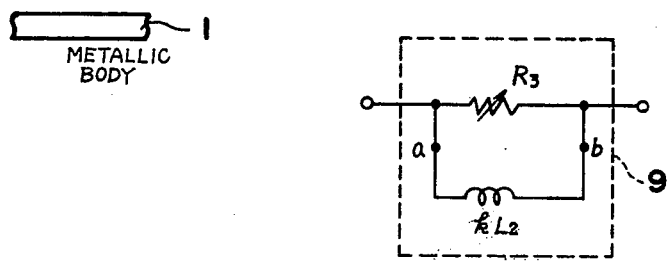
FIG. 8 shows an equivalent portion of the circuit of FIG. 7.

In the series circuit 11, the observed inductance between points $a$ and $b$ in the circuit can be varied by varying the magnitude (amplitude) of the voltage applied to the inductance $L_2$. That is, $$i = \frac{e_{out} \cdot 1/k}{j\omega L_2}$$

$$= \frac{e_{out}}{j\omega L_2 \cdot k} \quad (1)$$

where $k$ = constant. From the formula (1) it is seen that multiplying the output voltage ($e_{out}$) by 1/k is equivalent to multiplying the fixed inductance $L_2$ by $k$ when considering the current flowing between the points $a$ and $b$. Accordingly, the observed inductance of the series circuit 11 can be varied by varying the resistance of the variable resistor $R_2$ to vary the magnitude of the voltage applied to the fixed inductance $L_2$. Thus, when $k=R_2/R_2'$ where $R_2'$ is the resistance between points $c$ and $d$ through the variable resistor $R_2$, the voltage between the points $c$ and $d$ can have a value which is 1/k times the output voltage $e_{out}$. Hence, if the variable resistor $R_2$ were connected directly to the fixed inductance $L_2$, a parallel combined resistance of the resistance $R_2'$ and a resistance $R_2''$ between the points $a$ and $c$ would be connected in series to the fixed inductance $L_2$, and hence the impedance between the points $a$ and $b$ would have a resistance component of $R_2''/R_2'$ and could not be considered to consist only of a reactance component. Accordingly, the impedance converter 10 consisting of an element such as an emitter follower or a voltage follower is inserted between the fixed inductance $L_2$ and the variable resistor $R_2$ in order to minimize the resistance component $R_2''/R_2'$ to be negligible with respect to the fixed inductance $L_2$. As a result, the impedance between the points $a$ and $b$ can be equivalently considered to consist substantially only of a reactance component. Consequently, the observed impedance between the points $a$ and $b$ can be nearly $J\omega L_2 \cdot k$ by adjusting the variable resistor $R_2$ in the series circuit 11, and accordingly, the inductance $L_2$, which is actually fixed, can act as it it is the variable by adjusting the variable resistor $R_2$. Accordingly, the feedback circuit 9 can be represented by an equivalent circuit shown in FIG. 8. When expressing the combined impedance in the feedback circuit 9 by $Z_s$, $$Z_s = \frac{R_3 \cdot j\omega L_2 \cdot k}{R_3 + j\omega L_2 \cdot k}$$

$$= \frac{\omega L_2 \cdot k \cdot R_3}{R_3^2 + (\omega k L_2)^2} (k \cdot \omega L_2 + jR_3) \quad (2)$$

Thus, the resistance component in the feedback circuit 9 can be adjusted by changing the value of $k$, that is, by varying the resistance $R_2'$ of the variable resistor $R_2$, and the reactance component can be adjusted by varying the resistance of the vairable resistor $R_3$. The variable resistors $R_2$ and $R_3$ may be conventional variable resistors.

Thus, according to the embodiment of FIG. 7, as the inductance component can be varied to any desired value by means of the variable resistors without changing the actual inductance, the adjustment range can be wider and the fine adjustment can be made as compared with the method described in connection with FIG. 6, resulting in the realization of easy and highly accurate measurement of distance.

Figure 1:
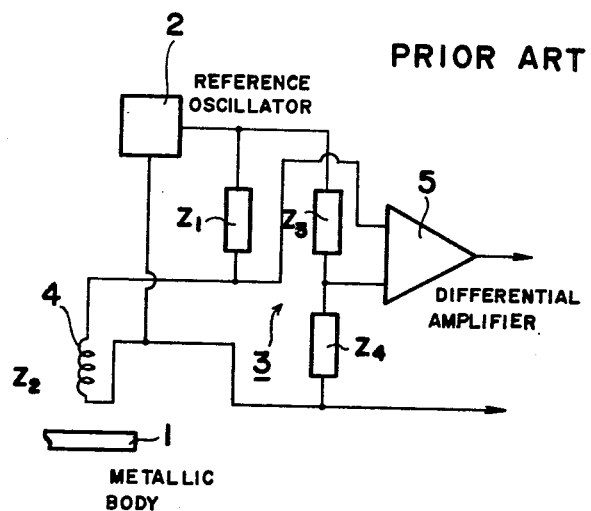
FIG. 1 is a block diagram showing a prior art measuring apparatus.
Figure 2:
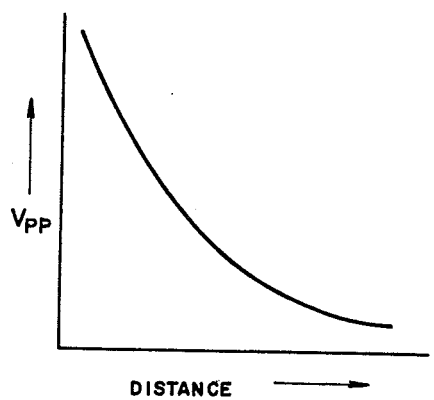
FIG. 2 is a graph showing the output characteristic of the apparatus of FIG. 1.
Figure 3:
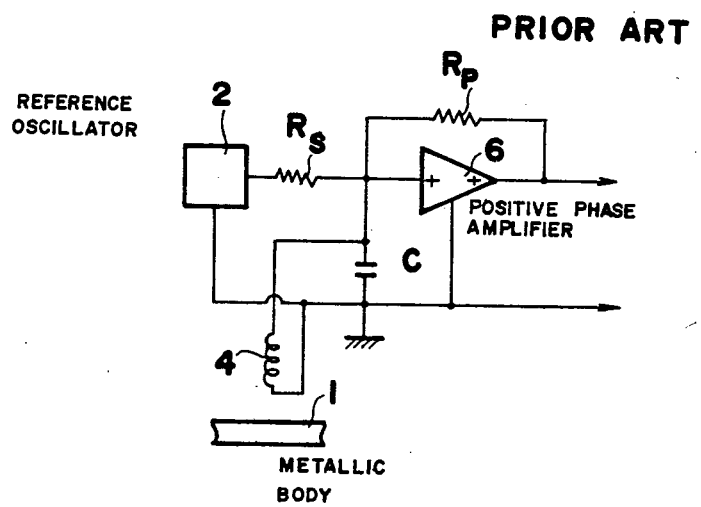
FIG. 3 is a block diagram showing another prior art measuring apparatus.
Figure 9:
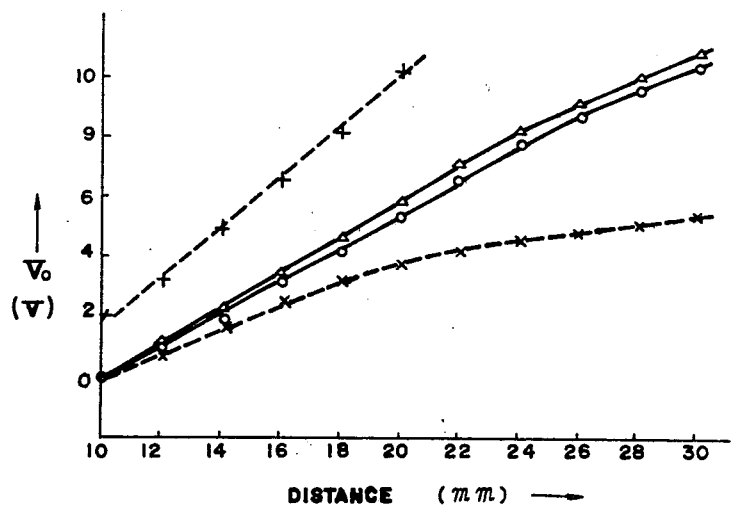
FIG. 9 is a graph showing the output characteristics in the embodiments of the invention.

FIG. 9 is a graph illustrating for comparison purposes the characteristic curves according to the invention and the characteristic curves according to the apparatus of FIG. 3, wherein the output voltage $E_0$ of the reference oscillator 2 is fixed and only the frequency $f_0$ thereof is varied. In the figure, solid lines are for the apparatus of invention (frequency variation ratio $\Delta f/f_0$ = 4.3 %), and dotted lines are for the apparatus of FIG. 3) frequency variation ratio = 1 %). As seen from the figure, according to the invention the error in output with respect to the frequency variation is very small as compared with that in the apparatus of FIG. 3.

In general, the impedance of the coil varies (usually increases) with the variation of the temperature thereof. When the temperature of the detecting coil 4 varies, the feedback ratio $\beta$ varies and the amplification A varies causing error in the measurement. For eliminating such error, the feedback impedance $Z_s$ contains the coil $L_1$ or $L_2$ as shown in the embodiments of FIG.

Figure 10:
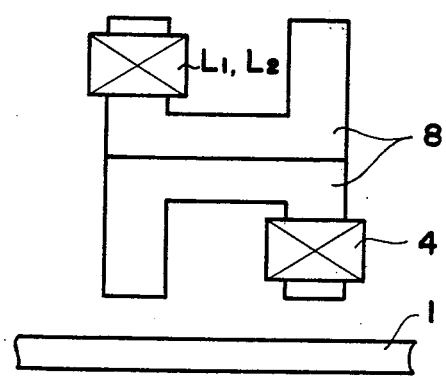
FIGS. 10 and 11 show respectively the arrangements of feedback impedance in other embodiments of the invention.
Figure 11:
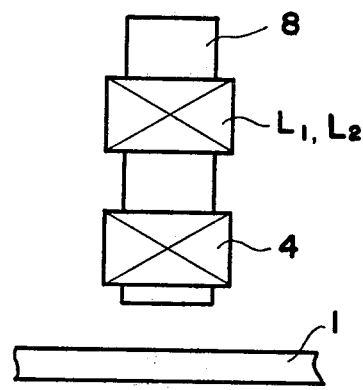

6 and FIG. 7, and the detecting coil 4 and the coil in the impedance $Z_s$ are wound about an integral core 8 as shown in FIGS. 10 and 11. As the impedance variation ratios with respect to the temperature variation in the respective coils are approximately equal to each other, the feedback ratio is maintained at a constant value. Thus, non-contact measurement of distance with high performance can be realized regardless of the variation in temperature.

As is apparent from the above description, in the present invention, the feedback network contains no resonance circuit, and accordingly the amplifier keeps a good characteristic as shown in FIG. 9 regardless of the variation of the oscillation frequency of the reference oscillator 2, the measurement can be performed with any desired oscillation frequency, the adjustment is easy, and thus measurement with good frequency characteristic can be attained.

What is claimed is:

1. Apparatus for measuring the distance between a detecting coil and a metallic body mounted in opposition thereto, said apparatus comprising a differential amplifier having positive and negative input terminals, a reference oscillator connected to the negative input terminal of the amplifier, a feedback circuit connected to the positive input of said differential amplifier, said feedback circuit incorporating said detecting coil such that amplified AC signals from said reference oscillator are applied to the detecting coil through said feedback circuit, the amplified differential output signal between said AC signals applied to said differential amplifier and the signal also supplied to said differential amplifier and resulting from the impedance of the detecting coil corresponding to the distance between the detecting coil and the metallic body being thus a measure of said distance; at least one of the parameters of open-loop gain of the differential amplifier and the impedance of the feedback circuit being pre-determined so as to linearize at least for a pre-determined measuring range the output characteristics of said differential amplifier originating from the variation of the detecting coil impedance caused by the variation of said distance.

2. The apparatus according to claim 1 wherein said feedback circuit provides a linear relation between the output voltage of the differential amplifier and the said distance and comprises a feedback impedance element including an inductance element in series with said detection coil.

3. The apparatus according to claim 2 wherein said inductance element is a variable inductor, said feedback circuit further comprising a variable resistor connected in series with said inductor.

4. The apparatus according to claim 1 wherein said feedback circuit provides a linear relation between the output voltage of the differential amplifier and the said distance and comprises a parallel having a series branch of a variable resistor for dividing said output voltage, an impedance converter and a fixed inductor, and a variable resistor connected in parallel with said series branch said parallel circuit being connected in series with said detection coil.

5. The apparatus according to claim 2 wherein said detecting coil has a core connected to the core of said inductance element such that measurement error at said detecting coil due to variation of temperature is automatically compensated.

6. The apparatus according to claim 5 wherein said detecting coil and said inductance element have a common core on which their coils are wound.

* * * * *